United States Patent
Chari et al.

(10) Patent No.: US 7,324,794 B2
(45) Date of Patent: Jan. 29, 2008

(54) PHASE COMBINING DIVERSITY

(75) Inventors: Sujai Chari, San Franciso, CA (US); Rajeev Krishnomoorthy, San Jose, CA (US)

(73) Assignee: Tzero Technologies, Inc., Sunnyvale, CA (US)

( * ) Notice: Subject to any disclaimer, the term of this patent is extended or adjusted under 35 U.S.C. 154(b) by 256 days.

(21) Appl. No.: 10/952,620

(22) Filed: Sep. 29, 2004

(65) Prior Publication Data
US 2006/0073802 A1 Apr. 6, 2006

(51) Int. Cl.
*H04B 17/02* (2006.01)
*H04B 7/00* (2006.01)

(52) U.S. Cl. ............. 455/130; 455/139; 455/276.1

(58) Field of Classification Search ........... 455/101, 455/132–140, 272–278.1, 562.1, 69
See application file for complete search history.

(56) References Cited

U.S. PATENT DOCUMENTS

| | | | | |
|---|---|---|---|---|
| 5,697,083 A * | 12/1997 | Sano | .................. | 455/276.1 |
| 5,710,995 A * | 1/1998 | Akaiwa et al. | .................. | 455/277.2 |
| 5,841,816 A * | 11/1998 | Dent et al. | .................. | 375/331 |
| 5,875,216 A * | 2/1999 | Martin | .................. | 375/347 |
| 5,940,453 A * | 8/1999 | Golden | .................. | 375/347 |
| 6,064,865 A * | 5/2000 | Kuo et al. | .................. | 455/135 |
| 6,151,487 A * | 11/2000 | Kim et al. | .................. | 455/134 |
| 6,448,938 B1 * | 9/2002 | Chiang et al. | .................. | 343/850 |
| 6,535,497 B1 | 3/2003 | Raith | | |
| 6,757,267 B1 | 6/2004 | Evans et al. | | |
| 6,760,386 B2 * | 7/2004 | Li et al. | .................. | 375/267 |
| 6,784,838 B2 * | 8/2004 | Howell | .................. | 342/377 |
| 6,909,759 B2 * | 6/2005 | Ariyavisitakul et al. | .... | 375/347 |
| 6,940,932 B2 * | 9/2005 | Henriksson | .................. | 375/347 |
| 7,024,168 B1 * | 4/2006 | Gustafsson et al. | .......... | 455/135 |
| 7,031,669 B2 * | 4/2006 | Vaidyanathan et al. | ........ | 455/84 |
| 7,039,095 B2 * | 5/2006 | Takahashi | .................. | 375/148 |
| 2003/0090435 A1 | 5/2003 | Santhoff et al. | | |
| 2003/0123582 A1 * | 7/2003 | Kim et al. | .................. | 375/347 |
| 2003/0186660 A1 * | 10/2003 | Lee | .................. | 455/140 |
| 2004/0087275 A1 * | 5/2004 | Sugar et al. | .................. | 455/61 |
| 2004/0137857 A1 * | 7/2004 | Seo | .................. | 455/101 |
| 2004/0198265 A1 * | 10/2004 | Wallace et al. | .................. | 455/118 |
| 2004/0229588 A1 * | 11/2004 | Cho | .................. | 455/278.1 |
| 2004/0242173 A1 * | 12/2004 | Takeda | .................. | 455/132 |
| 2005/0032497 A1 * | 2/2005 | Girardeau et al. | .......... | 455/272 |
| 2005/0250564 A1 * | 11/2005 | Kishigami et al. | ........ | 455/575.7 |
| 2006/0166634 A1 * | 7/2006 | Ido | .................. | 455/277.1 |

* cited by examiner

*Primary Examiner*—Simon Nguyen
(74) *Attorney, Agent, or Firm*—Brian R. Short

(57) ABSTRACT

Embodiments of methods of receiving transmitted signals are disclosed. The methods include a first antenna receiving a second signal, a second antenna receiving a second signal, adjusting a phase relationship between the first signal and the second signal, combining the phase adjusted first signal and second signal, and processing the phase adjusted first signal and second signal to determine the phase adjustment for optimizing at least one of signal to noise ratio and signal to interference ratio of the combined signals.

50 Claims, 12 Drawing Sheets

PHASE COMBINING DIVERSITY

FIELD OF THE INVENTION

The invention relates generally to network communications. More particularly, the invention relates to methods and apparatus for phase combining diversity.

BACKGROUND OF THE INVENTION

Home networking is evolving into an environment in which people will be sharing photographs, music, video, data and voice among networked consumer electronics, personal computers and mobile devices throughout the home. Consumers will be able to stream video content from a personal computer or electronic device to flat panel high-definition television (HDTV) without the use of wires. A technology that will be implemented for enabling these capabilities is ultra wideband (UWB). UWB is a wireless technology designed for short-range, personal area networks.

The Federal Communications Committee (FCC) has mandated that UWB radio transmission can legally operate in the frequency range of 3.1 GHz to 10.6 GHz, at a transmission power of −41.25 dBm/MHz, having a minimum bandwidth of 500 MHz. Basically, UWB devices provide wide bandwidth transmission at very low signal power levels. Due to the low transmission signal power levels of UWB, transmission interference is a big issue. The interference can be from both non-UWB devices, and similar UWB devices.

FIG. 1 shows an example of an indoor broad band wireless communication network 100. The network 100 includes a high definition television (HDTV) monitor 110 networked with other devices, such as, a digital video recorder (DVR) 120, a digital video disk (DVD) player 140 and a computing device 130.

HDTV streaming video requires large bandwidths of information. Therefore, the networking of devices that include streaming HDTV must be capable of handling high bandwidths. Additionally, the devices of the network must be resistance to both self-interference and interference from other wireless communication signals. UWB wireless signals operate at very low power levels, making resistance to interference more difficult.

Personal home networks operating at very high data bandwidths can suffer from multi-path, which can constructively or destructively add to the main (typically, the shortest) transmission path. The multi-path signals are delayed copies of the signal of the main path multiplied by a random phase and amplitude, and cause inter-symbol interference (ISI). That is, an echo of a previously transmitted symbol can interfere with the reception of a present symbol.

The low transmission power levels of UWB networks make them susceptible to interference from like and unlike interferers. UWB devices within a home network are typically located proximate to each other, and as a result, can interfere with each other. Situations can include, for example, a UWB device being located very close to an undesired UWB source, while trying to communicate with a UWB device that is not as close as the undesired UWB device.

Diversity communication can be used to minimize the effects of multi-path and interference. For example, FIG. 2 shows a receiver 210 that includes two receiver antennas 222, 224. One of the two antennas 222, 224 is connected to a receiver chain that includes a channel filter 230, a low noise amplifier (LNA) 240, a frequency down-converter 250, an automatic gain controller (AGC) 260, a base band filter 270 and an analog to digital converter (ADC) 280. Generally, signals S1, S2 received by each of the two antennas 222, 224 have travel different transmission paths. Therefore, each of the received signals S1, S2 is typically subjected to different degrees of multi-path and interference. The receiver 210 can select one of the signals S1, S2 for reception. Essentially, base-band processing includes selecting each antenna individually based upon signal power and/or channel response measurements. Typically, the antenna providing the most desirable signal power and channel response is selected. However, the selection can be based upon a combination of several received signal parameters, such as, signal power, channel delay spread and channel frequency selectivity.

It is desirable to have an apparatus and method for a wireless diversity reception that can be implemented with low-cost devices, and can effectively increase the signal to noise, and/or the signal to interference ratios of received signals.

SUMMARY OF THE INVENTION

An embodiment of the invention includes a method of receiving transmitted signals. The method includes a first antenna receiving a first signal, a second antenna receiving a second signal, adjusting a phase relationship between the first signal and the second signal, combining the phase adjusted first signal and second signal, and processing the phase adjusted first signal and second signal to determine the phase adjustment for optimizing at least one of signal to noise ratio (SNR) and signal to interference ratio (SIR) of the combined signals. Other embodiments include optimizing either the SNR or the SIR.

Another embodiment of the invention also includes a multi-chain receiver. The receiver includes a first receiver chain connected to a first receiver antenna and a second receiver chain connected to a second receiver antenna. An adjustable phase adjustor adjusts a first phase of a first signal received by the first receiver chain with respect to a second phase of a second signal received by the second receiver chain. A processor for processing the phase adjusted first signal and second signal to determine the phase adjustment for optimizing at least one of signal to noise ratio and signal to interference ratio of the combined first and second signals.

Another embodiment includes a transceiver. The transceiver includes a receiver and a transmitter. The receiver includes a first receiver chain connected to a first receiver antenna and a second receiver chain connected to a second receiver antenna. An adjustable phase adjustor adjusts a first phase of a first signal received by the first receiver chain with respect to a second phase of a second signal received by the second receiver chain. A processor for processing the phase adjusted first signal and second signal to determine the phase adjustment for optimizing at least one of signal to noise ratio and signal to interference ratio of the combined first and second signals. The transmitter includes a first transmitter chain connected to the first antenna, and a second transmitter chain connected to the second antenna. The adjustable phase adjustor also adjusts a first phase of a first transmit signal of the first transmitter chain with respect to a second phase of a second transmit signal of the second transmitter chain.

Other aspects and advantages of the present invention will become apparent from the following detailed description, taken in conjunction with the accompanying drawings, illustrating by way of example the principles of the invention.

DETAILED DESCRIPTION

Figure 1:
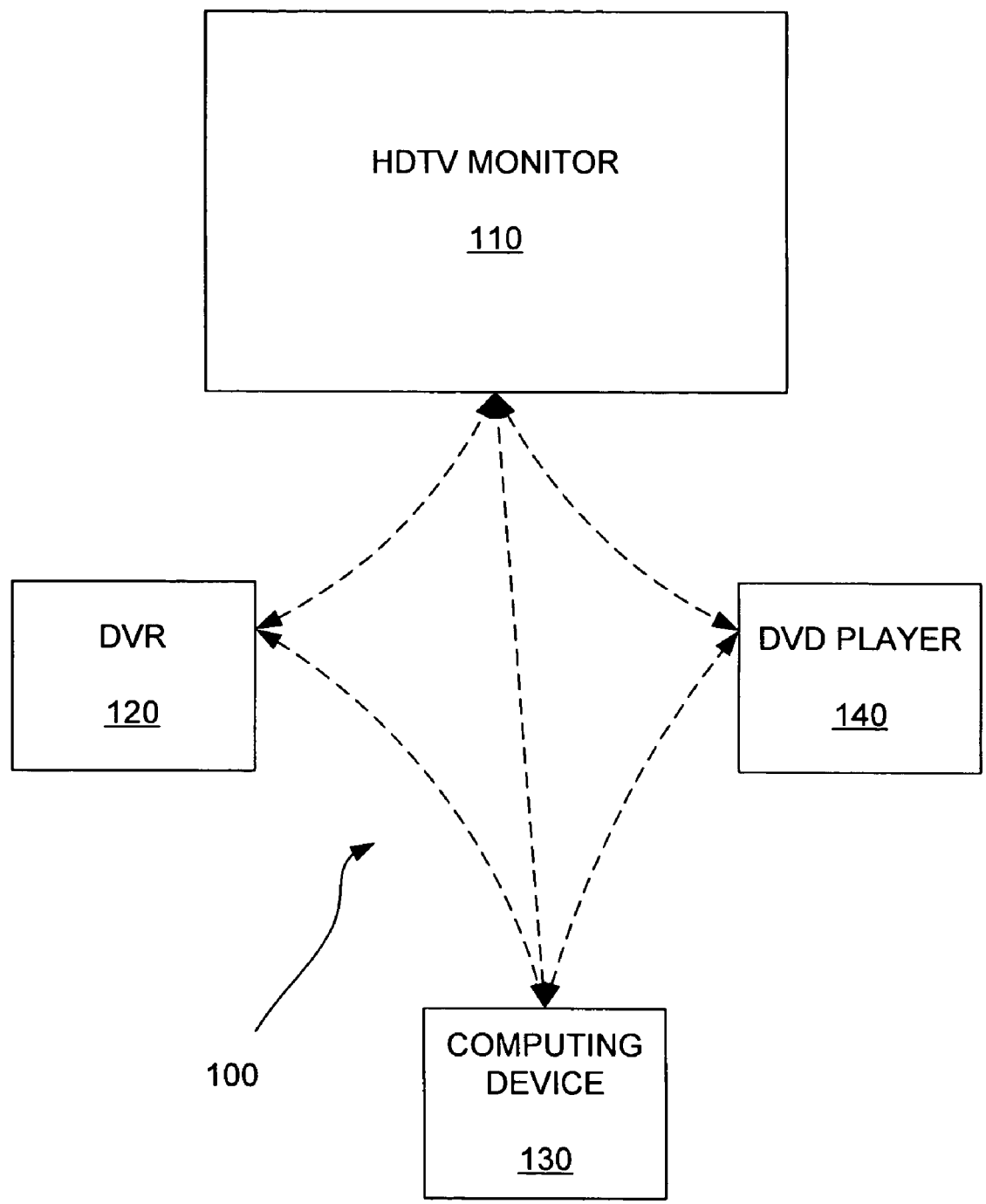
FIG. 1 shows a wireless home network.
Figure 2:
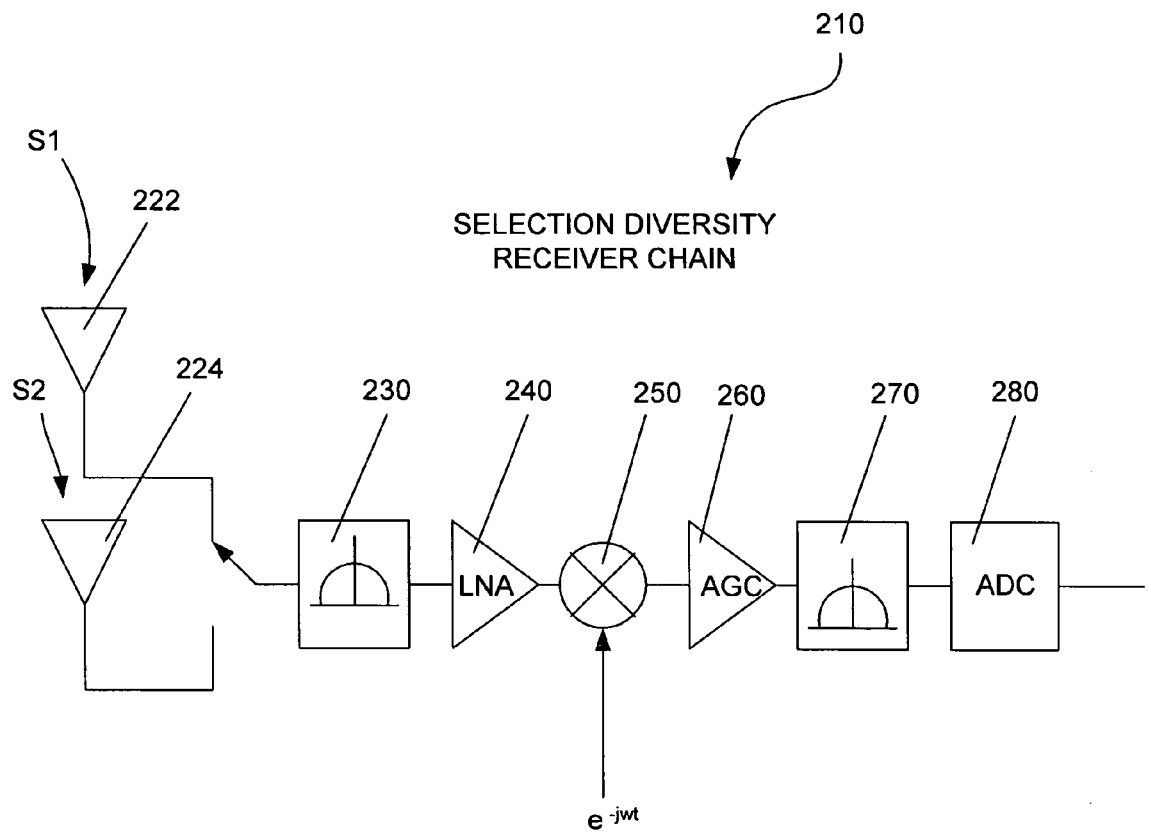
FIG. 2 shows a multiple antenna diversity receiver.

As shown in the drawings for purposes of illustration, the invention is embodied in an apparatus and method for phase combining diversity receiving of low power, high bandwidth transmission signals.

Figure 3:
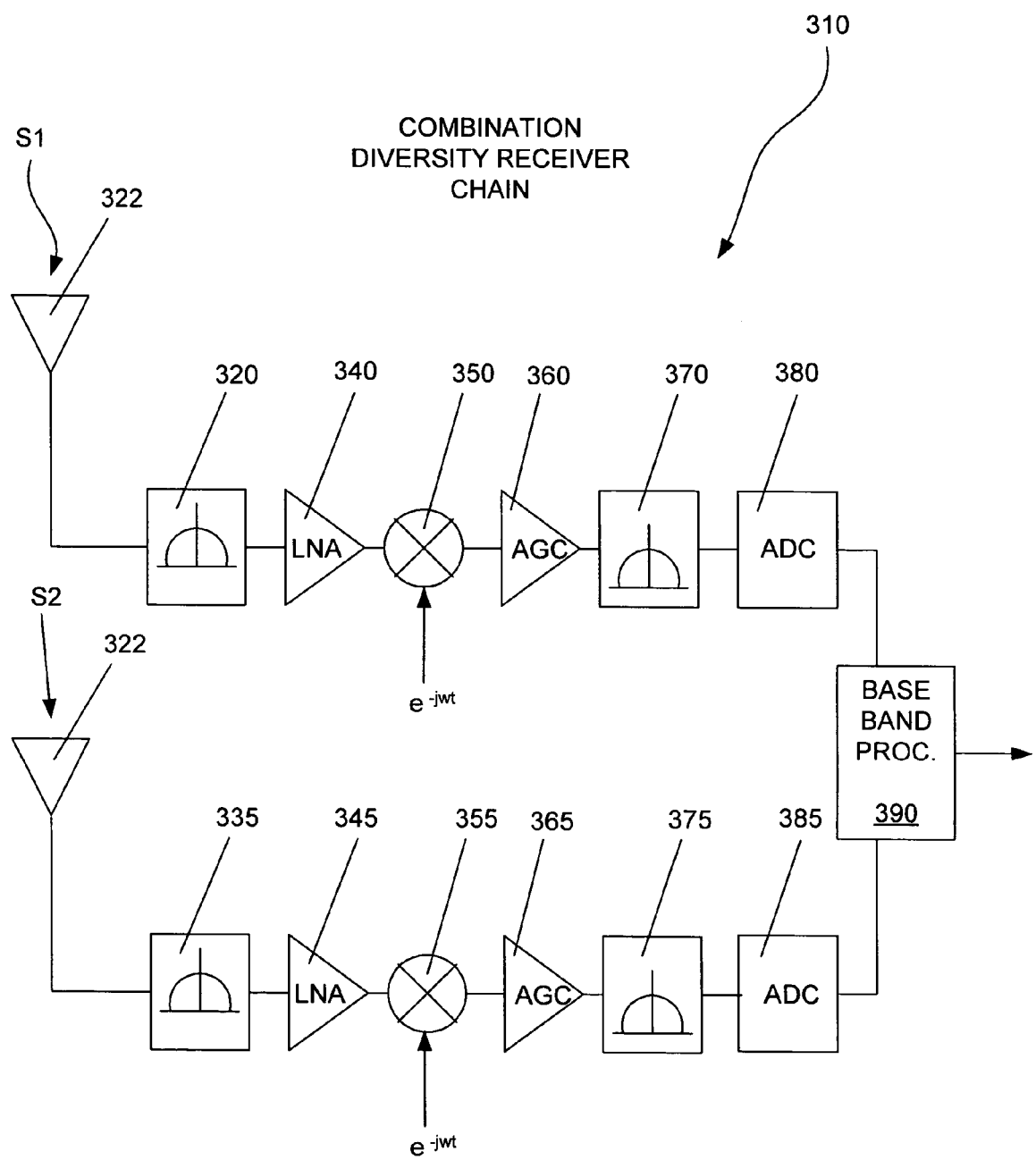
FIG. 3 shows another multiple antenna diversity receiver.

FIG. 3 shows another multiple antenna diversity receiver 310. This diversity receiver 310 typically includes Maximal Ratio Combining (MRC). Generally, MRC includes independently weighting signals received by each antenna of a multiple antenna receiver, and combining the weighted signals. Typically, the weighting is selected to maximize a signal to noise (SNR) of the combined signals. For multi-carrier signals, the weighting can be performed independently on each sub-carrier signal.

As FIG. 3 shows, the diversity receiver 310 includes two receiver chains. The first receiver chain includes a first antenna 320, first filter 330, a first amplifier 340, a first frequency down converting mixer 350, a first automatic gain control (AGC) 360, a first band-pass filter 370 and a first analog to digital converter (ADC) 380. The second receiver chain includes a second antenna 322, a second filter 335, a second amplifier 345, a second frequency down converting mixer 355, a second automatic gain control (AGC) 365, a second band-pass filter 375 and a second analog to digital converter (ADC) 385. A base band processor 390 process the signals received by the first and second receiver chains.

Clearly, the diversity receiver 310 is expensive due to the large number of components required for each of the receiver chains. A more desirable receiver configuration includes a substantial portion of the performance benefits of the diversity receiver 310, but can be implemented more cost effectively.

Figure 4:
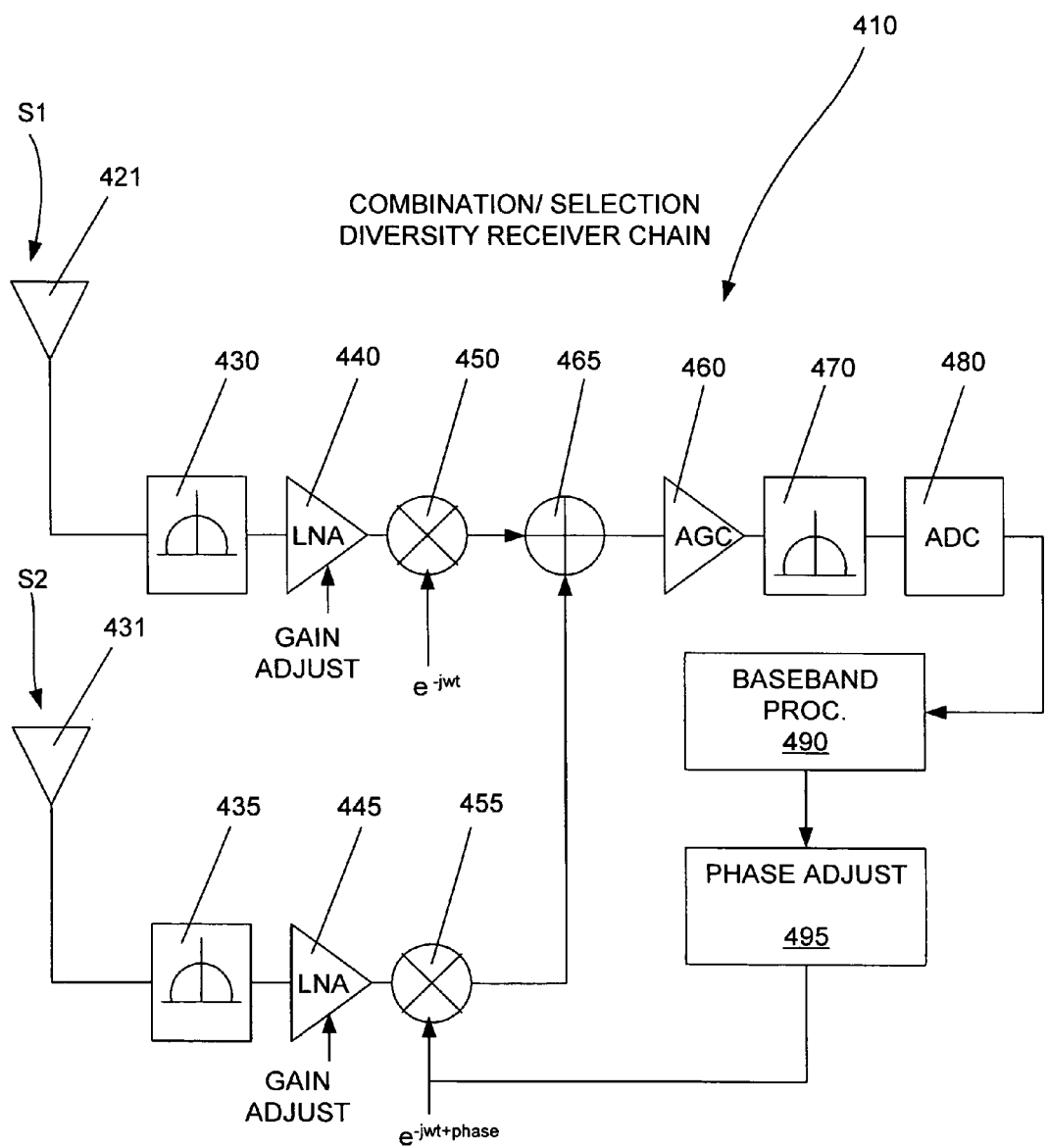
FIG. 4 shows another multiple antenna diversity receiver.

FIG. 4 shows another multiple antenna diversity receiver 410. The diversity receiver 410 provides some of the performance benefits of the diversity receiver 310 of FIG. 3, but can be implemented with fewer components. Therefore, the diversity receiver 410 of FIG. 4 is less expensive to implement than the diversity receiver 310 of FIG. 3.

The diversity receiver 410 includes multiple abbreviated receiver chains. The first chain includes a first antenna 421, a first filter 430, a first amplifier 440 and a first frequency down-converting mixer 450. The second chain includes a second antenna 431, a second filter 435, a second amplifier 445 and a second frequency down-converting mixer 455. Only two abbreviated receiver chains are shown in FIG. 4. However, any number of abbreviated receiver chains can be included.

A combiner 465 receives the frequency down-converted signals for the first and second receiver chains. An AGC 460 controls a gain of the combined output of the combiner 465. A band-pass filter 470 filters the combined output before being converted to a digital bit stream by and ADC 480. The digital bit stream is processed by baseband processing circuitry 490.

The signal S1 received by the first receiver chain is frequency down-converted by the first frequency down-converting mixer 450 as determined by a down converting signal represented by $e^{-jwt}$. The signal S2 received by the second receiver chain is frequency down-converted by the second frequency down-converting mixer 455 as determined by a down converting signal represented by $e^{-jwt+\Phi}$. The phase offset $\Phi$ is controlled by the baseband processing circuitry 490. It is to be understood that the phase offset $\Phi$ is a relative phase between the two down converter chains of the receiver, rather than an absolute phase. Another configuration could include phase offset adjustments of both chains while controlling the relative difference between the two.

The diversity receiver 410 operates by adjusting the phase of the signal S2 received by the second receiver chain relative to the signal S1 received by the first receiver chain, through a phase adjuster 495. The phase adjustment can be on either of the received signals S1, S2.

The LNA(s) 440, 445 of FIG. 4 include amplitude adjustments (GAIN ADJUST). The amplitude adjustments can be on either one, or both of the receiver chains. The amplitude adjustments of the LNA(s) 440, 445 can compensate for amplitude distortion introduced by the elements of the receiver chains.

Figure 5:
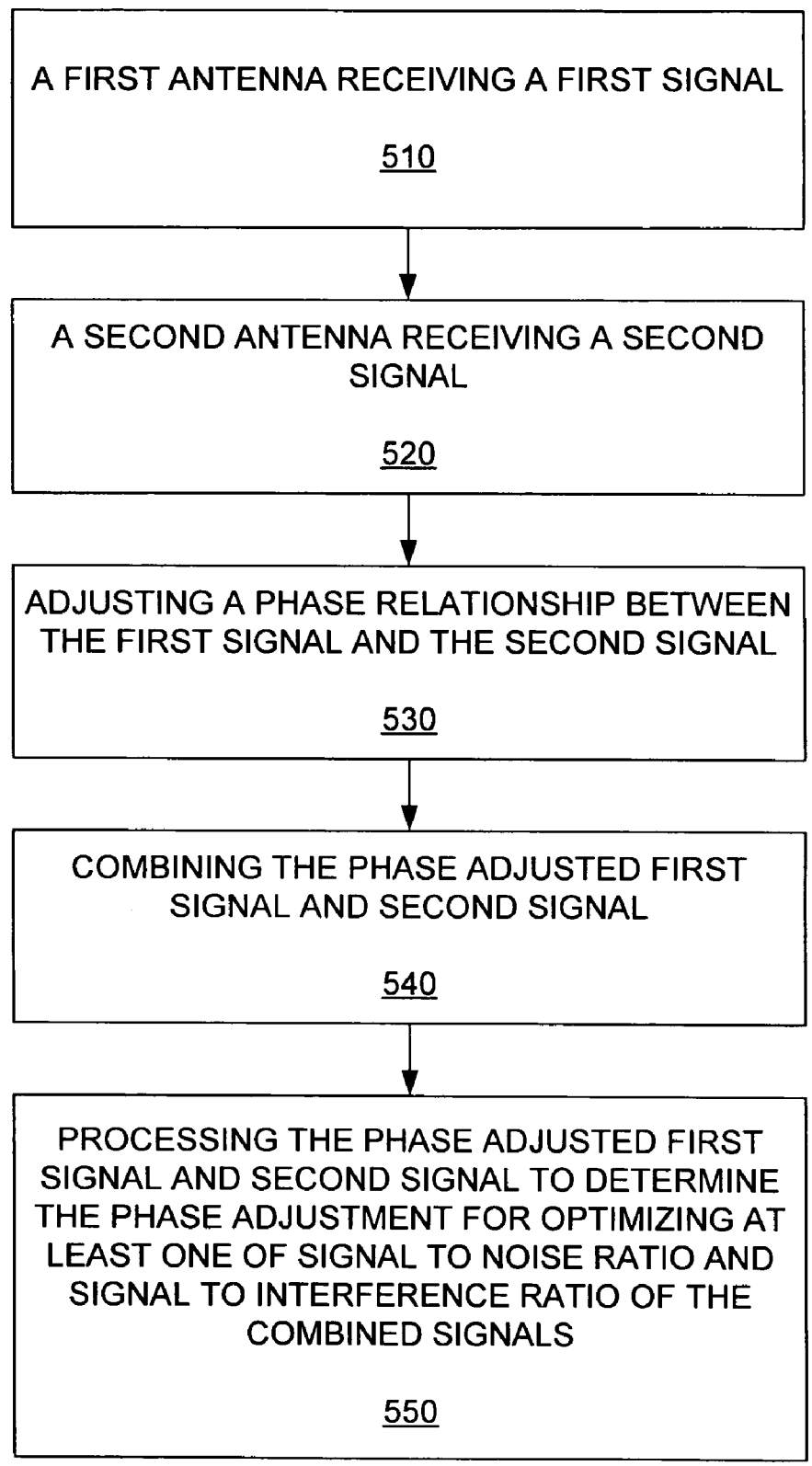
FIG. 5 is a flow chart of a method of diversity reception.

FIG. 5 is a flow chart of a method of diversity reception. The method includes a first step 510 that includes a first antenna receiving a first signal. A second step 510 includes a second antenna receiving a second signal. A third step 530 includes adjusting a phase relationship between the first signal and the second signal. A fourth step 540 includes combining the phase adjusted first signal and second signal. A fifth step 550 includes processing the phase adjusted first signal and second signal to determine the phase adjustment for optimizing at least one of signal to noise ratio and signal to interference ratio of the combined signals.

Channel Responses

Figure 6:
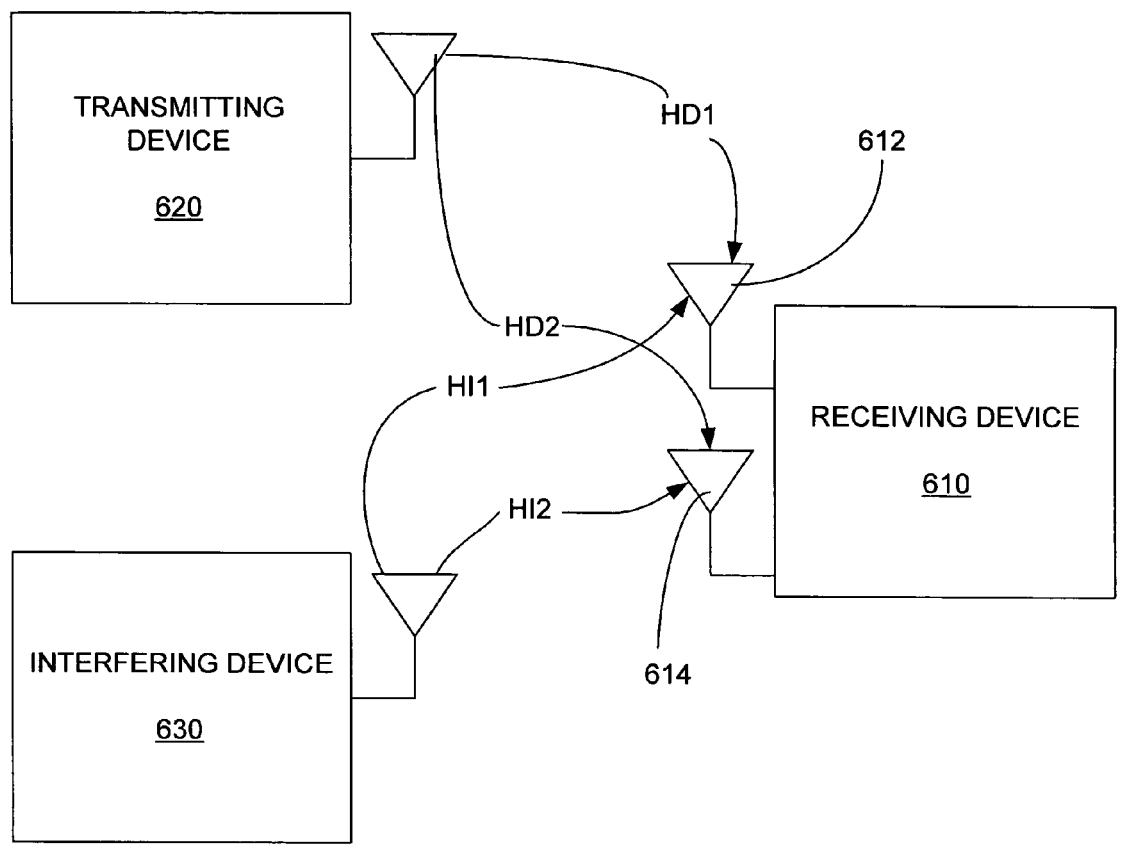
FIG. 6 shows several wirelessly networked devices and shows transmission channels between the devices.

FIG. 6 shows a receiving device 610 receiving signals from a desired transmitting device 620 and an interfering device 630. The receiving device 610 includes multiple antennas 612, 614. Multiple desired channel responses $H_{D1}$, $H_{D2}$ are formed between a transmitting antenna of the desired transmitting device 620 and the antennas 612, 614 of the receiving device 610. Multiple interference channel responses $H_{I1}$, $H_{I2}$ are formed between a transmitting antenna of the interfering device 630 and the antennas 612, 614 of the receiving device 610. Clearly, the receiving device can include additional antennas, and additional devices can interfere.

The channel responses of the transmitting device 620 and the interfering device 630 can be determined by characterizing training tones. The devices 620, 630 periodically transmit predetermined training tones that the receiving device 610 can use to compare with received signals to determine the channel responses. The devices 620, 630 also transmit synchronization sequences that allow the receiving device 610 to identify the transmitted signals. This identification allows the receiving device to separate the signals of the transmitting device from interfering signals of the interfering device 630. As will be described, the channel responses can be used to determine the optimal phase adjustments of the signals received by the multiple antenna receivers. The, receiving device 610 of FIG. 6 includes two antennas 612, 614, and therefore, two channel responses corresponding to each transmitting and interfering device. The number of antennas of the receiving device can be increased, and the number of channel responses would correspondingly increase.

Receiver Selecting Versus Receiver Combining

The receiver of FIG. 4 can select to operate in either selection diversity mode, or combine diversity mode depending upon the characteristics of the transmission channels. If the signal power of one of the channels is substantially greater than the signal power of the other channel, selection diversity may provide the best reception. Additionally, if the received signals are uncorrelated, selection diversity may be the preferred diversity reception mode.

The level of correlation can be determined by performing cross-correlation calculations among channel estimates of the multiple antennas. If the correlation is below a predetermined threshold, the signals received through the channels can be designated as uncorrelated.

Multi-Carrier Transmission Signals

Figure 7:
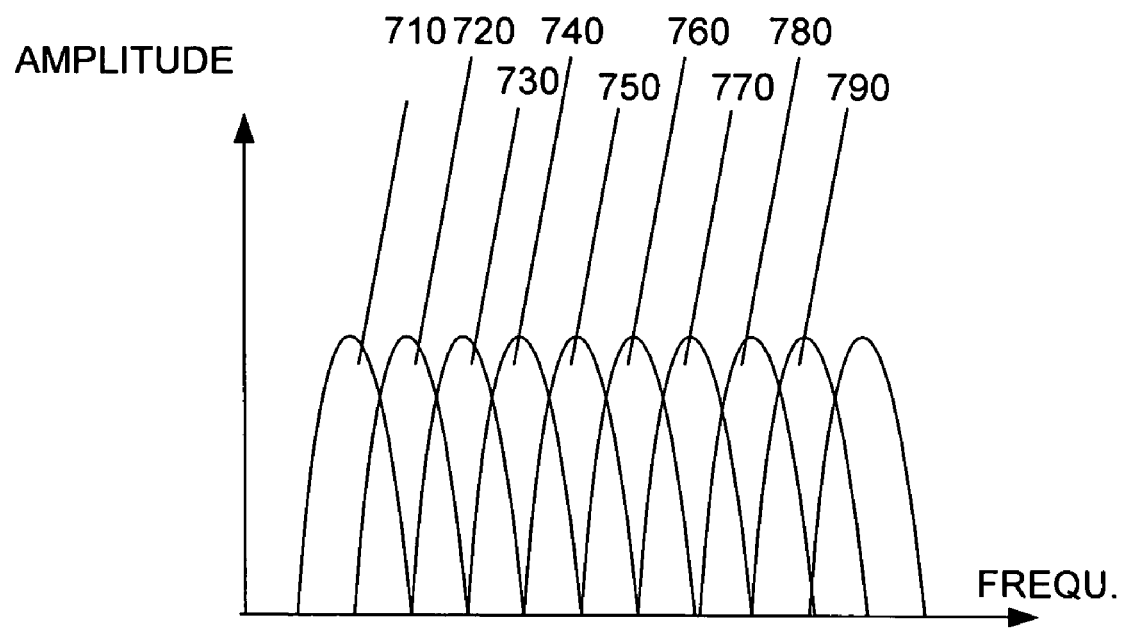
FIG. 7 shows a frequency spectrum of multi-carrier signals of a wireless network.

The transmission signals can be multi-carrier signals, such as, orthogonal frequency division multiplexing (OFDM) signals. To alleviate the effects of ISI, an implementation of UWB includes orthogonal frequency division multiplexing (OFDM) signal transmission. OFDM is a special form of multi-carrier modulation in which multiple user symbols are transmitted in parallel using different sub-carriers. The sub-carriers have overlapping frequency spectra, but their signal waveforms are specifically chosen to be orthogonal. OFDM systems transmit symbols that have substantially longer time durations than the length of the impulse response of the transmission channel, thereby allowing avoidance of ISI. OFDM modulation techniques are very efficient in indoor broad band wireless communication. FIG. 7 shows a frequency spectrum of OFDM sub-carrier signals 710, 720, 730, 740, 750, 760, 770, 780, 790. Each sub-carrier 710, 720, 730, 740, 750, 760, 770, 780, 790 is modulated by a separate linear combination of incoming symbols.

Receiver Combining—SIR Versus SNR

As described above, diversity combining is generally the preferred method of diversity reception when the received signals are correlated. If diversity combining is determined to be desirable, the optimal phase relationship between the received diversity signals must be determined. This determination can be dependent upon whether the received signals include proportionally larger noise distortion, or signal interference distortion.

SNR Dominant Distortion

If SNR distortion is the dominant distortion, the desire phase adjustment of the received diversity signals can be determined by the channel impulse responses $h_{D1}(k)$ and $h_{D2}(k)$ (k carriers of a multi-carrier signal) of the receiving antennas from the desired source. For a multi-band OFDM transmission system, channel estimation symbols can be used to estimate the channel impulse responses. The channel estimation symbols can include any predetermined or known wideband transmission sequence. A fast fourier transform (FFT) can be performed on the received signal (removing the cyclic prefix if the signals are multi-carrier signals). The transformed signals are divided by transmitted channel estimation symbols providing a frequency response of the channel responses $H_{D1}(m)$ and $H_{D2}(m)$. An inverse fast fourier transform (IFFT) of the channel responses $H_{D1}(m)$ and $H_{D2}(m)$ yields the impulse responses $h_{D1}(k)$ and $h_{D2}(k)$. The impulse responses $h_{D1}(k)$ and $h_{D2}(k)$ can be truncated (windowed) to a predetermined length based upon known information about the channels to improve the accuracy of the estimates of the impulse responses $h_{D1}(k)$ and $h_{D2}(k)$. The optimal phase can be determined by:

$$\phi_{opt}=arg\ max_\phi \Sigma_\Phi \Sigma_k |h_{D1,k}+h_{D2,k}e^{j\phi}|^2$$

Where $h_{D1}(k)$ is the signal channel response for the first antenna from the desired device, $h_{D2}(k)$ is the signal channel response for the second antenna from the desired device, and $\Phi=\{0, \phi_A, 2\phi_A, \ldots, 2\pi-\phi_A\}$ is a set of possible phases.

The optimal phase can be calculated by the baseband processor 490 or the equivalent. The phase adjustment between the received signals can be set by the phase adjuster 495 or the equivalent. The phase adjustment causes the correlated received signals to effectively sum coherently, which provide greater effective signal amplitude. The net result is a higher effective SNR of the received signals. If the phase adjusted received signals of the two channels coherently combine, an increase in SNR can be as great as 3 dB.

Determination of whether the received signals include SNR dominant distortion or SIR dominant distortion can be made during a scanning mode of the receiver. That is, during periods of inactivity (not receiving a desired signal) the receiver measures ambient or background noise levels. The receiver can be frequency selective, allowing the receiver to differentiate between noise and interfering signals. Interfering signals tend to be bursty, and can be detected by a frequency selective receiver.

SIR Dominant Distortion

If SIR distortion is the dominant distortion, the desire phase adjustment of the received diversity signals can be determined by the-channel impulse responses $h_{I1}(k)$ and $h_{I2}(k)$ of the receiving antennas from the interfering source. For a multi-band OFDM transmission system, channel estimation symbols can be used to estimate the channel impulse responses. The channel estimation symbols can include any predetermined or known wideband transmission sequence. A fast fourier transform (FFT) can be performed on the received signal (removing the cyclic prefix if the signals are multi-carrier signals). The transformed signals are divided by transmitted channel estimation symbols providing a frequency response of the channel responses $H_{I1}(m)$ and $H_{I2}(m)$. An inverse fast fourier transform (IFFT) of the channel responses $H_{I1}(m)$ and $H_{I2}(m)$ yields the impulse responses $h_{I1}(k)$ and $h_{I2}(k)$. The impulse responses $h_{I1}(k)$ and $h_{I2}(k)$ can be truncated (windowed) to a predetermined length based upon known information about the channels to improve the accuracy of the estimates of the impulse responses $h_{I1}(k)$ and $h_{I2}(k)$. The optimal phase can be determined by:

$$\phi_{opt}=arg\ min_\phi \Sigma_\Phi \Sigma_k |h_{I1,k}+h_{I2,k}e^{j\phi}|^2$$

Where $h_{I1}(k)$ is the signal channel response for the first antenna from the interfering device, $h_{I2}(k)$ is the signal channel response for the second antenna from the interfering device, $\Phi=\{0, \phi_A, 2\phi_A, \ldots, 2\pi-\phi_A\}$ is a set of possible phases.

The optimal phase can be calculated by the baseband processor 490 or the equivalent. The phase adjustment between the received signals can be set by the phase adjuster 495 or the equivalent. The phase adjustment causes the interference received signals to effectively negate each other, which provides a minimized effective interference signal amplitude. The net result is a higher effective SIR of the received signals.

Figure 8:
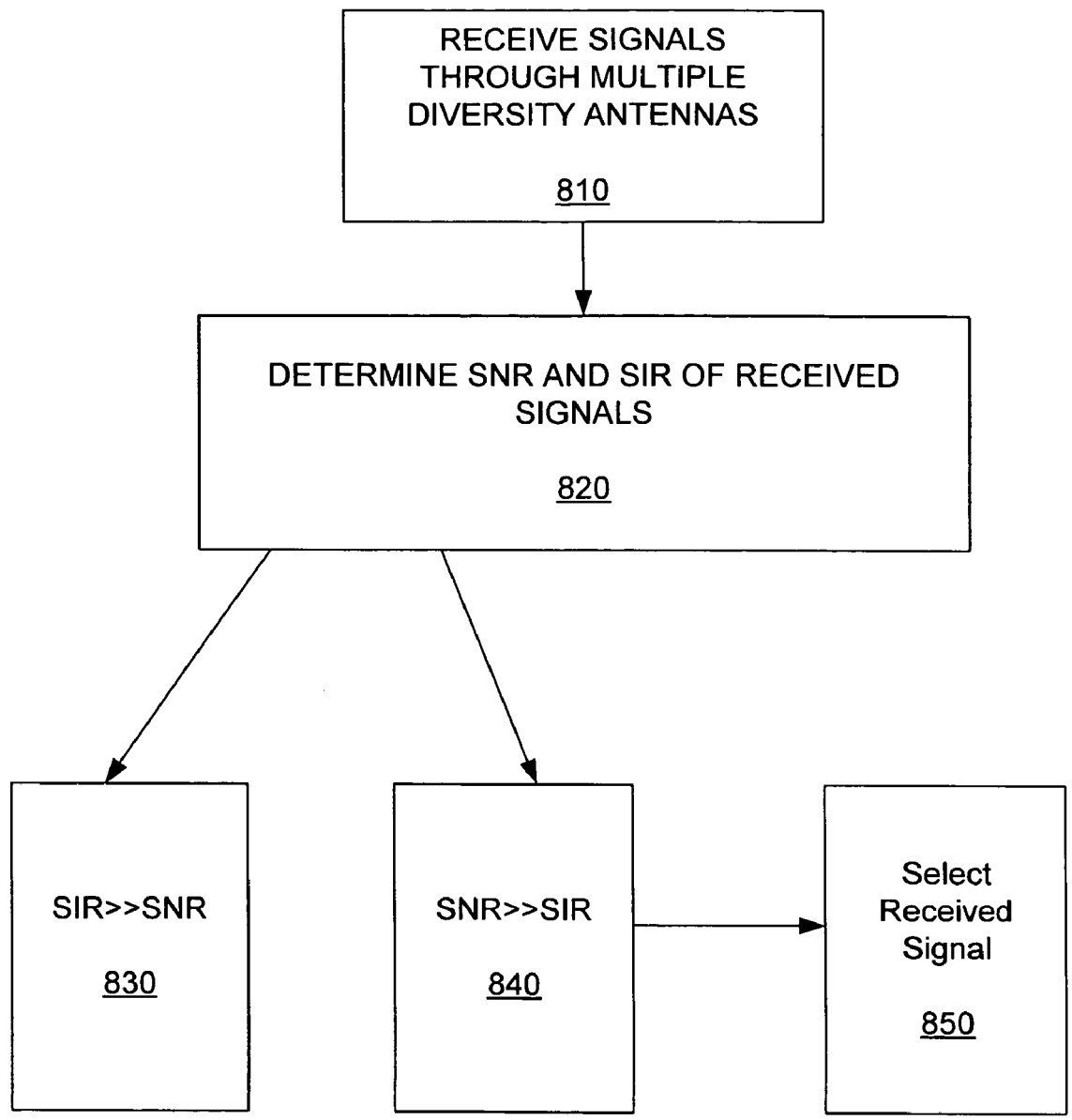
FIG. 8 shows additional embodiments of diversity reception processing.

FIG. 8 is a flow chart showing steps included in receive diversity signal phase adjustment based upon channel responses of multiple receive antennas. A first step 810 includes receiving multiple signals through multiple diversity antennas. A second step 820 includes determining whether the received signals are SNR dominant or SIR dominant. If the received signals are interference dominant (SIR is a threshold less than the SNR), a third step 830 is executed that includes an optimal phase adjustment of the interference signal channel responses as described above. If the signals are noise dominant (SNR is a threshold less than the SIR), a fourth step 840 is executed that includes an optimal phase adjustment of the desired signal channel responses as described above. If the optimal phase adjustment of the desired signal channel response of the fourth step 840 provides a maximal response that is less than a maximal signal strength of any of the received signals, then a fifth step 850 is executed which include selecting the receiver chain having the maximum received signal strength. More specifically, if:

Max $\Sigma_k |h_{D1,k} + h_{D2,k} e^{j\Phi}|^2$ is less than either $\Sigma_k |h_{D1,k}|^2$ or $\Sigma_k |h_{D2,k}|^2$, then the received signal corresponding to the larger maximal channel response is selected.

If the distortion is determined to be SIR dominated, then an embodiment includes determination of whether the signal energy of a summation of a combination of interference signal channel responses of the first signal and the second signal is greater than signal energy of an interference signal channel response of first signal energy, and signal energy of interference signal channel response of the second signal, then using both the first signal and the second signal for reception. However, if signal energy of interference signal channel response of the first signal is greater than signal energy of a summation of a combination of interference signal channel responses of the first signal and the second signal, and signal energy of interference channel response of the second signal, then using the first signal for reception.

If the distortion is determined to be SNR dominated, then an embodiment includes determination of whether the signal energy of a summation of a combination of interference signal channel responses of the first signal and the second signal is greater than signal energy of interference signal channel response of the first signal, and signal energy of the interference signal channel response of the second signal, then using the first signal and the second signal for reception. However, if signal energy of interference signal channel response of the first signal is greater than signal energy of a summation of a combination of interference signal channel responses of the first signal and the second signal, and signal energy of interference signal channel response of the second signal, then using the first signal for reception.

Phase Selection of Multi-Carrier Signals

The receiver of the multiple signals can be frequency selective. For multiple carrier signals, such as OFDM signals, the optimal phase selection can be based upon a joint optimization of SNR and SIR. The SNR and SIR optimizations as described can be can be performed on individual carriers of the multi-carrier signals. A single phase selection can be made for joint optimization of the combination of all the carriers. It is possible for some of the carriers to be noise dominated, and other carriers to be interference dominated. An optimal phase selection can be determined for each individual carrier. A joint optimal phase selection for the entire multi-carrier signal can be made base upon the optimal phase of a combination of each of the individual carriers. That is, the phase selection may not be ideal for each individual sub-carrier, but rather, the phase selection attempts to optimize the combination of the multi-carriers. More generally, the phase of each of the carriers of the multi-carrier signal is adjusted by determination of at least one of an optimization of SNR over multiple sub-carriers, a joint optimization of SNR and SIR over multiple sub-carriers, or an optimization of SIR over multiple sub-carriers.

Transmit Processing

Figure 9:
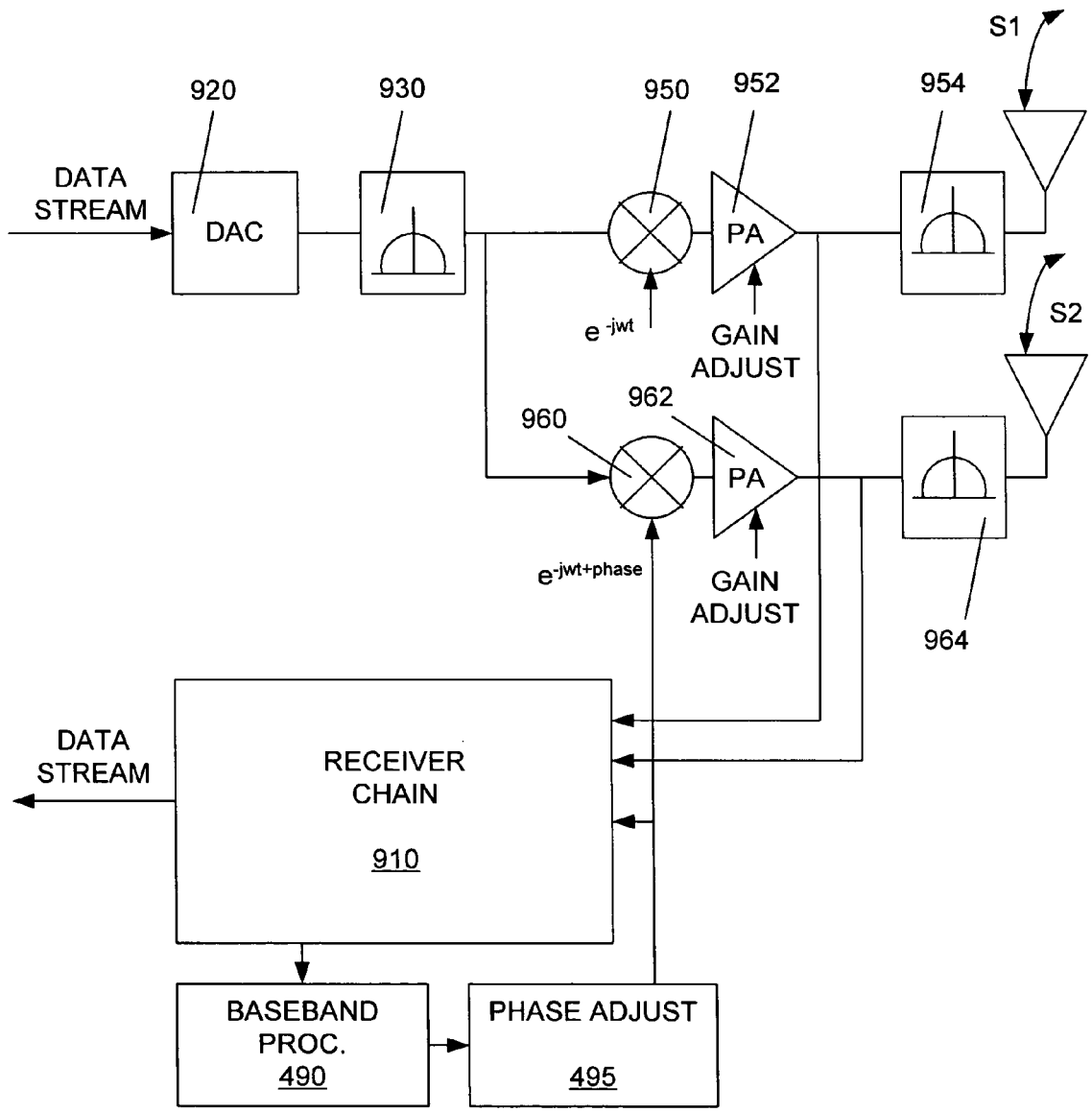
FIG. 9 shows a transceiver that includes transmit processing.

The transmit signals can also be phase adjusted to provide enhancement of SNR and SIR of the received signals. FIG. 9 shows a transceiver that includes transmit processing. The transceiver includes a receiver chain 910 that can include a combination/selection diversity receiver as shown in FIG. 4. The transceiver also includes transmitter chains that can be connected to the same multiple antennas as the receiver chain 910. As shown, a first signal S1 can be received or transmitted from a first antenna, and a second signal S2 can be received or transmitted from a second antenna.

The transmitter chains receive a data stream (DATA STREAM) for transmission. A digital to analog converter (DAC) 920 converts the digital stream into an analog signal, which is filtered by a base band filter 930. The diversity transmitter includes two abbreviated transmitter chains. A second transmitter chain includes a frequency up-converting mixer 950, a power amplifier 952 and a filter 954. A second transmitter chain includes a frequency up-converting mixer 960, a power amplifier 962 and a filter 964. Only two abbreviated transmitter chains are shown in FIG. 9. However, any number of abbreviated transmitter chains can be included.

The signal SI is generated by the first transmit chain by frequency up-converting the analog signal with the first frequency up-converting mixer 950, as determined by an up-converting signal represented by $e^{+jwt}$. The signal S2 is generated by the second transmit chain by frequency up-converting the analog signal with the second frequency up-converting mixer 960, as determined by an up-converting signal represented by $e^{+jwt+\Phi}$. Actual implementations of the frequency up-conversion are typically implemented with an I-Q modulator in which I and Q base band signals are modulated with cosine and sine carrier signals of a desired frequency. The phase offset $\Phi$ is controlled by the base band processing circuitry 490. It is to be understood that the phase offset $\Phi$ is a relative phase between the two down converter chains of the transmitter, rather than an absolute phase. Another configuration could include phase offset adjustments of both chains while controlling the relative difference between the two.

The diversity transmitter operates by adjusting the phase of the signal S2 transmitted by the second transmitter chain relative to the signal S1 transmitted by the first transmitter chain, through the phase adjuster 495. The phase adjustment can be on either of the transmit signals S1, S2.

As shown in FIG. 9, the phase adjustor 495 can determine the relative phase of both the transmitter and receiver portions of the transceiver. If reciprocity of transmission channels is assumed, then adjusting the relative phase of the transmit signals can aid the receiver of the transmit signals. That is, adjusting the phase of the received signal to optimize SNR can be used to also optimize the SNR of the transmit signals, if the receive and transmit signal travel through the same transmission channels. An embodiment can include the transmit signals being phase adjusted to optimize SNR, while receive signals are phase adjusted to optimize SIR. Optimization of the phase can, therefore, be determined as previously described.

Additional Transceiver Chain Gain Adjustment

The PA(s) 952, 962 of FIG. 9 include amplitude adjustments. The amplitude adjustments can be on either one, or both of the transmitter chains. The amplitude adjustments of the PAs can compensate for amplitude distortion introduced by the elements of the transmitter chains.

Performance Provided by Receiver Combining

Figure 10:
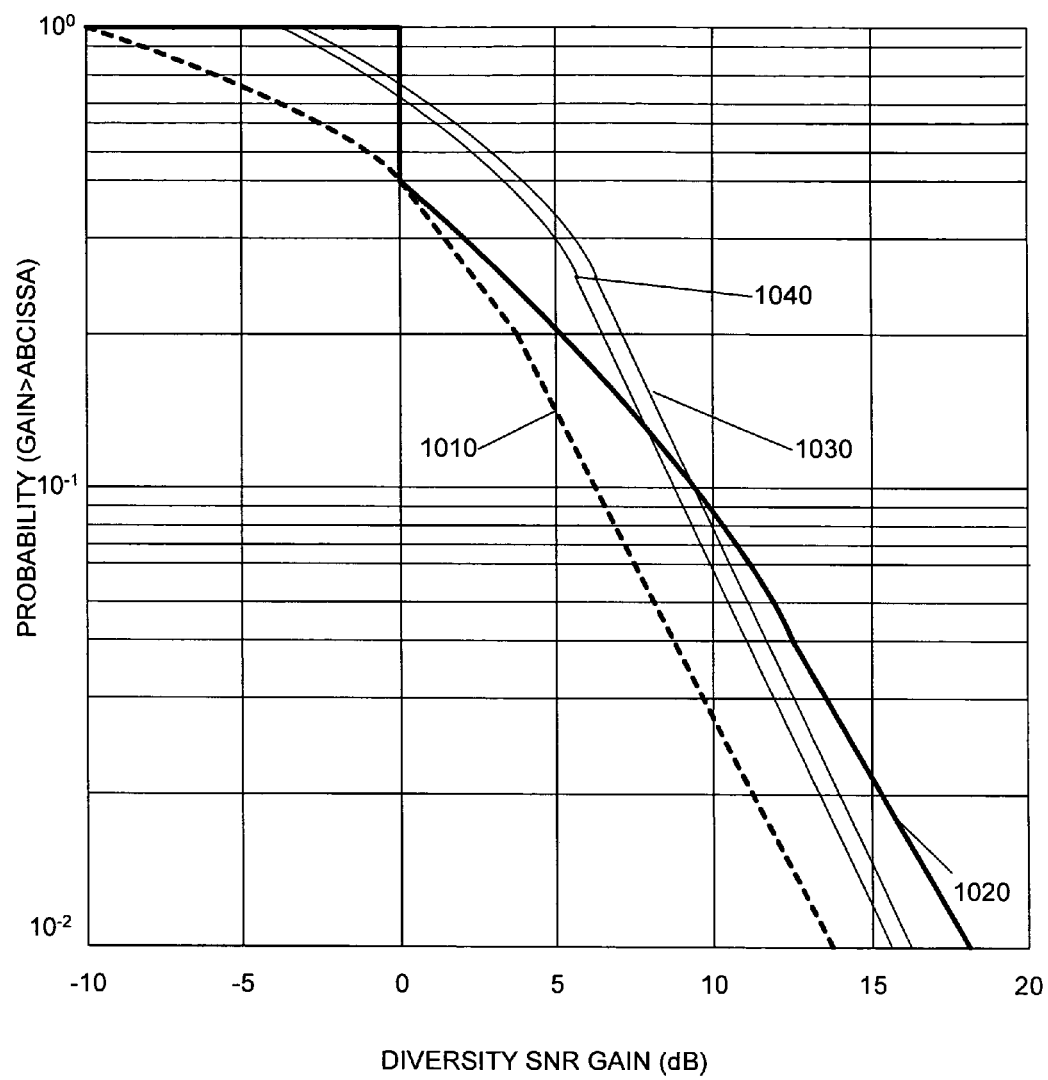
FIG. 10 is a plot depicting SNR performance of embodiments of diversity receivers.

FIG. 10 is a plot showing the SNR performance of a combination diversity for several different receiver configurations. The transmission channel is assumed to be a single tap Rayleigh fading channel. The plots depict simulated diversity gain with respect to non-diversity reception. Diversity gain is defined as the relative improvement in SNR compared to non-diversity reception. For these plots, the ratios of the SNRs are assumed to be equivalent.

A first curve 1010 represents a blind phase-combining receiver (that is, a phase-combining receive that includes no control over the relative phases of the received signals), and shows the probability of the diversity gain being of the receiver being greater than the abscissa of the plot. A second curve 1020 represents a selection receiver, and also shows the probability of the diversity gain being of the receiver being greater than the abscissa of the plot. The selection receiver provides a clearly benefit in performance over the blind phase-combining receiver.

A third curve 1030 represents a smart phase combining receiver having a phase adjuster having 1 degree of resolutions. A fourth curve 1040 represents a smart phase combining receiver having a phase adjuster having 90 degree of resolutions. As shown, the smart-phase combining receivers provide at least some performance advantages over both the blind phase-combining receiver and the selection receiver. The third curve 1030 and the fourth curve 1040 also show that the benefits of the smart phase combining receiver can be obtained with a fairly coarse resolution of the phase adjustment between the received signals.

Figure 11:
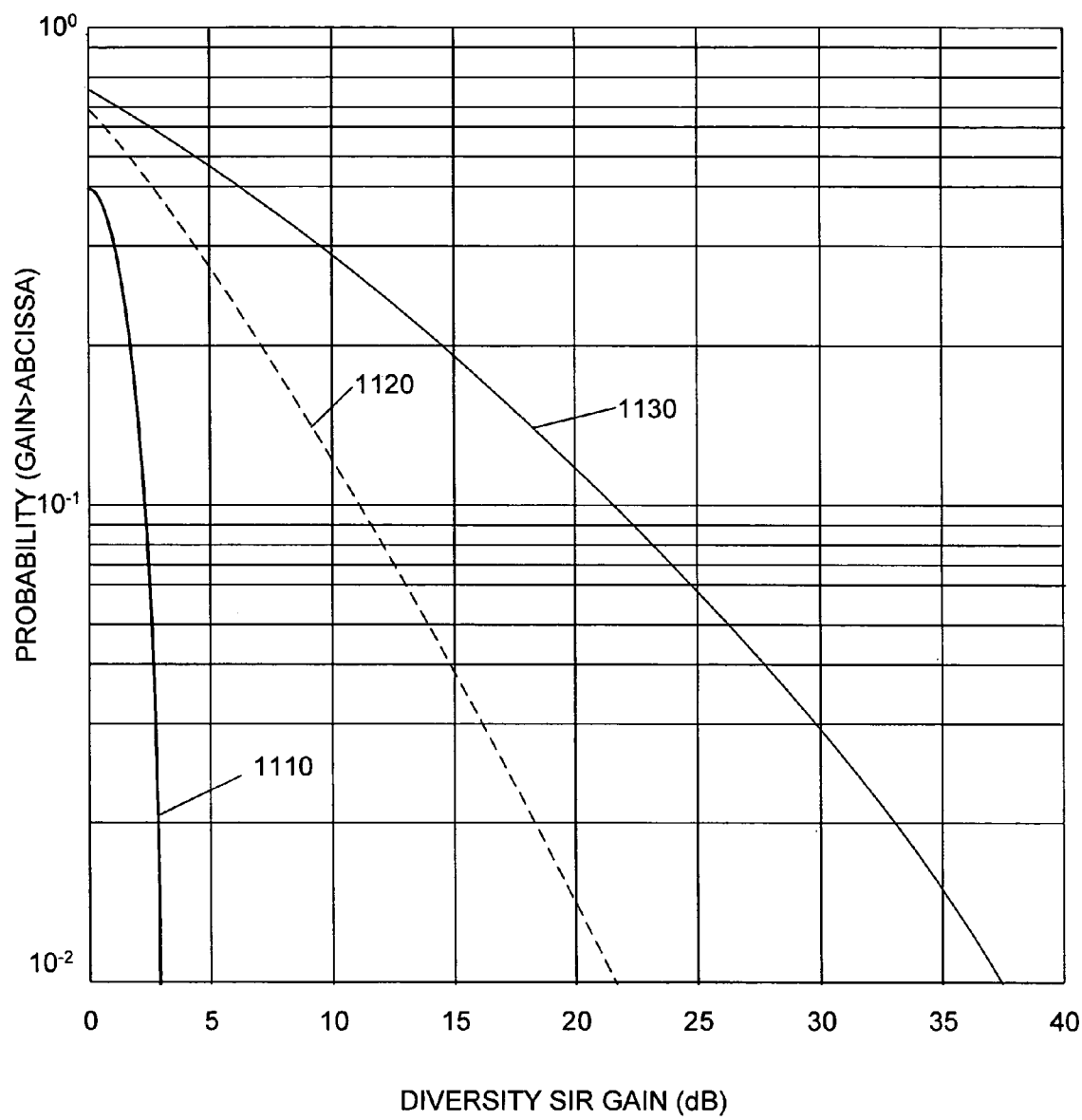
FIG. 11 is a plot depicting SIR performance of embodiments of diversity receivers.

FIG. 11 is a plot depicting SIR performance of embodiments of diversity receivers. The three curves 1110, 1120, 1130 show the SIR performance for a phase adjusted diversity receiver for different types of interference, and for different types of phase adjustment. The curves depict the probability the SIR gain is greater than the abscissa of the plot. The first curve 1110 shows the probability of SIR gain being greater than the abscissa, for a signal of interest that complies with a long range non-line of sight model (as provided by the Multi-Band OFDM Channel Modeling Subcommittee Report), and an interfering signal that complies with a short range line of sight model (as provided by the Multi-Band OFDM Channel Modeling Subcommittee Report). The resolution of the phase adjustment for the first curve 1110 is 1 degree. The second curve 1120 shows the probability of SIR gain being greater than the abscissa, for a signal of interest that complies with a long range non-line of sight model (as provided by the Multi-Band OFDM Channel Modeling Subcommittee Report), and an interfering signal that complies with a single tap Rayleigh fading channel. The resolution of the phase adjustment for the second curve 1120 is 90 degrees. The third curve 1130 shows the probability of SIR gain being greater than the abscissa, for a signal of interest that complies with a long range non-line of sight model (as provided by the Multi-Band OFDM Channel Modeling Subcommittee Report), and an interfering signal that complies with a single tap Rayleigh fading channel. The resolution of the phase adjustment for the second curve 1120 is one degree.

System Network of Devices Utilizing Multiple Receiver Antennas

Figure 12:
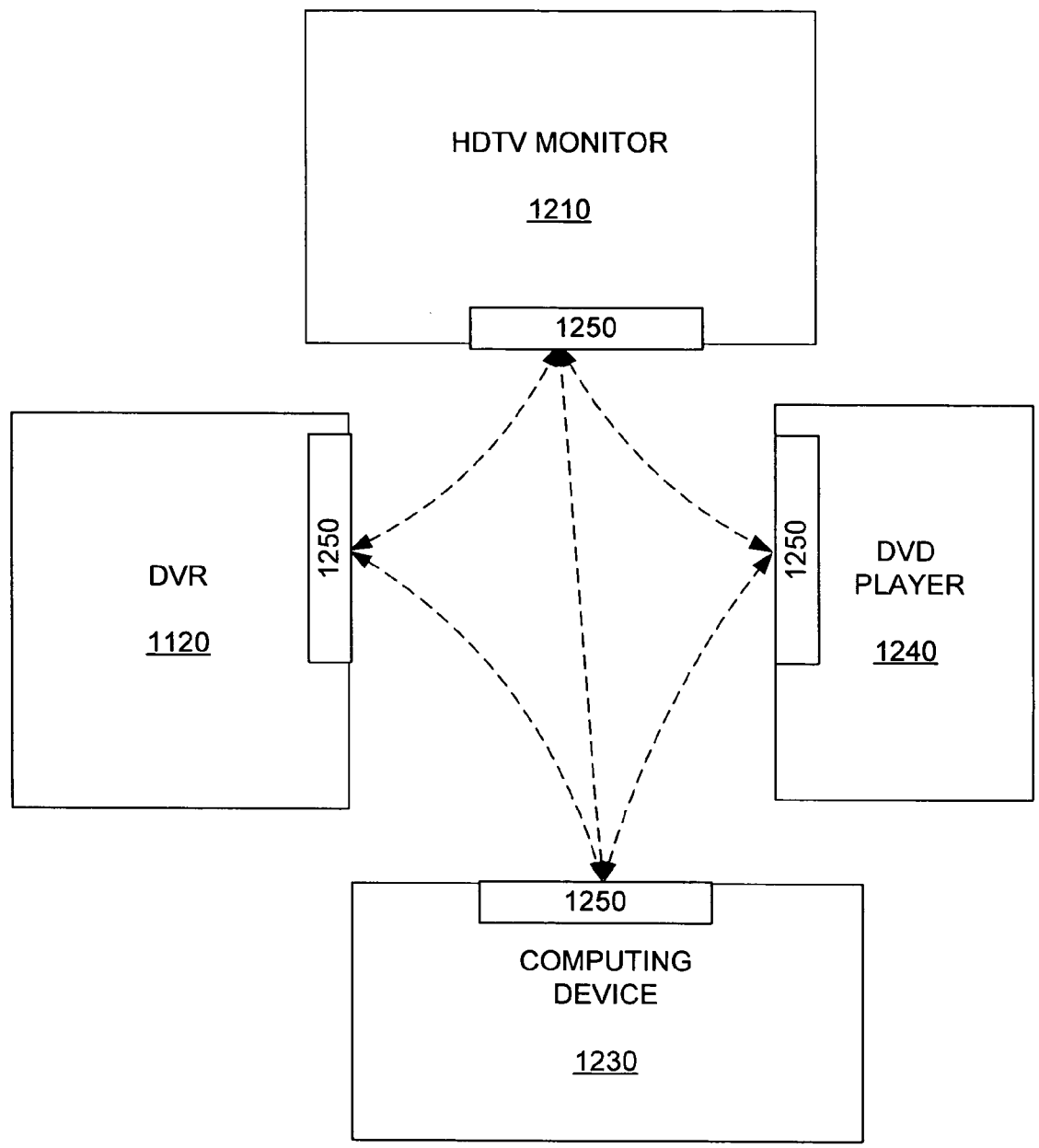
FIG. 12 shows a wireless network of devices in which the devices include multiple antenna diversity receivers.

FIG. 12 shows networked components that can benefit from the use of transmission pre-processing that include multi-carrier time spreading. The network can include, for example, a high definition television (HDTV) monitor 1210 networked with other devices, such as, a digital video recorder (DVR) 1220, a digital video disk (DVD) player 1240 and a computing device 1130. Each of the components 1210, 1220, 1230, 1240 include phase combining diversity receivers/transceivers 1250 as have been described.

Within a network environment, the determination of an optimal phase adjustment can be made at either the transmitter or receiver end of a transmitted signal. Furthermore, the actual phase adjustment can be made at either the transmitting or the receiving ends. The adjustment can be made, as described, to minimize noise distortion, interference distortion, or a combination of both noise and interference distortion. The phase adjustments can be made on multiple carrier signals. Multiple antennas can be located at either or both transmitters and receivers.

Another embodiment of a networked of electronic components includes the electronic components including a receiver and a transmitter. Each transmitter includes a first transmitter chain connected to a first transmitter antenna and a second transmitter chain connected to a second transmitter antenna. An adjustable phase adjustor for adjusts a first phase of a first signal received by the first transmitter chain with respect to a second phase of a second signal received by the second transmitter chain. A processor for processes the phase adjusted first signal and second signal to determine the phase adjustment for optimizing at least one of signal to noise ratio and signal to interference ratio, based on information from receivers of the electronic components. The information includes estimated channel responses of desired and undesired signals. The information can be generated by receivers of other electronic components, or by receivers within the same electronic component as the transmitter.

If the phase control determination is made by a receiver of another electronic component, the control (information) can be passed back to the transmitter through wireless feedback (also term side information) or through a wired feedback.

The descriptions have been primarily focused on diversity communication having multiple antennas at either the transmitter or the receiver. However, multiple antennas can exist at both the transmitter and the receiver providing multiple input, multiple output (MIMO) communications.

Additionally, the communication can include spatial multiplexing. Spatial multiplexing is a transmission technology that exploits multiple antennas at both transmitter and receiver to increase the bit rate in a wireless radio link with no additional power or bandwidth consumption. Under certain conditions, spatial multiplexing offers a linear increase in spectrum efficiency with the number of antennas. For example, if three antennas are used at the transmitter and the receiver, the stream of possibly coded information symbols is split into three independent sub-streams. These sub-streams occupy the same channel of a multiple access protocol. Possible same channel multiple access protocols include a same time slot in a time-division multiple access protocol, a same frequency slot in frequency-division multiple access protocol, a same code sequence in code-division multiple access protocol. The sub-streams are applied separately to the transmit antennas and transmitted through a radio channel. Due to the presence of various scattering objects in the environment, each signal experiences multipath propagation.

The composite signals resulting from the transmission are finally captured by an array of receiving antennas with random phase and amplitudes. At the receiver array, a spatial signature of each of the received signals is estimated. Based on the spatial signatures, a signal processing technique is applied to separate the signals, recovering the original sub-streams.

Although specific embodiments of the invention have been described and illustrated, the invention is not to be limited to the specific forms or arrangements of parts so described and illustrated. The invention is limited only by the appended claims.

What is claimed:

1. A method of receiving transmitted signals comprising:
   a first antenna receiving a first signal, the first signal comprising multiple sub-carrier signals;
   a second antenna receiving a second signal, the second signal comprising multiple sub-carrier signals;
   adjusting a phase relationship between the first signal and the second signal;
   combining the phase adjusted first signal and second signal;
   processing the combined phase adjusted first signal and second signal, the processing including selecting a single phase setting for the phase relationship between the first and second signals based on a weighted summation of a plurality of the sub-carrier signals, providing a joint optimization of SNR and SIR over a combination of sub-carriers.

2. The method of claim 1, wherein the first signal and the second signal comprise a desired signal and at least one interference signal.

3. The method of claim 1, wherein a finite number of phase adjustments exist, and the processing determines a selection of one of the phase adjustments.

4. The method of claim 1, wherein the processing comprises estimating a channel response associated with the first antenna, and estimating a channel response associated with the second antenna.

5. The method of claim 4, wherein the channel responses are between a desired signal source and the first antenna, and the second antenna.

6. The method of claim 4, wherein the processing further comprises adjusting the phase until the energy of combined channel responses is maximized.

7. The method of claim 4, further comprising windowing channel responses based on knowledge of the channel responses.

8. The method of claim 1, further comprising adjusting an amplitude of at least one of the first signal and second signal.

9. The method of claim 8, wherein the adjustment of the amplitude reduces the effect of gain variations of receiver chains associated with the first antenna and the second antenna.

10. The method of claim 1, wherein if a power level of the first signal is a threshold amount greater than a power level of the second signal, then only the second signal is selected for reception/processing.

11. The method of claim 1, further comprising determining a signal to noise ratio (SNR) and signal to interference ratio (SIR) of the first signal and the second signal.

12. The method of claim 11, wherein if the SIR is a threshold less than the SNR, then the phase is adjusted to minimize an energy of interfering signals resulting from a summation of channel responses of interference signals over a plurality of time samples.

13. The method of claim 12, wherein the minimization is based on response of tones of multi-carrier signals.

14. The method of claim 12, wherein SNR or SIR dominance is determined during a scanning mode of the receiver.

15. The method of claim 11, wherein if the SIR is a threshold less than the SNR, then the phase is adjusted to maximize the SIR.

16. The method of claim 15, wherein if signal energy of a summation of a combination of interference signal channel responses of the first signal and the second signal is greater than signal energy of an interference signal channel response of first signal energy, and signal energy of interference signal channel response of the second signal, then using both the first signal and the second signal for reception.

17. The method of claim 15, wherein if signal energy of interference signal channel response of the first signal is greater than signal energy of a summation of a combination of interference signal channel responses of the first signal and the second signal, and signal energy of interference channel response of the second signal, then using the first signal for reception.

18. The method of claim 11, wherein if the SIR is a threshold greater than the SNR, then the phase is adjusted to maximize an energy of desired signals resulting from a summation of desired signal channel responses over a plurality of time samples.

19. The method of claim 18, wherein the maximization is based on response of tones of multi-carrier signals.

20. The method of claim 11, wherein if the SIR is a threshold greater than the SNR, then the phase is adjusted to maximize the SNR.

21. The method of claim 20, wherein if signal energy of a summation of a combination of interference signal channel responses of the first signal and the second signal is greater than signal energy of interference signal channel response of the first signal, and signal energy of the interference signal channel response of the second signal, then using the first signal and the second signal for reception.

22. The method of claim 20, wherein if signal energy of interference signal channel response of the first signal is greater than signal energy of a summation of a combination of interference signal channel responses of the first signal and the second signal, and signal energy of interference signal channel response of the second signal, then using the first signal for reception.

23. The method of claim 1, further comprising determining whether the first signal and the second signal are uncorrelated;
   selecting reception of only the first signal or only the second signal if the first signal and the second signal are determined to be uncorrelated.

24. The method of claim 1, wherein the weighted summation of a plurality of the sub-carrier signals comprises a weighted summation of a plurality of sub-carrier channels of the sub-carrier signals.

25. The method of claim 1, wherein the weighted summation of a plurality of the sub-carrier signals comprises a weighted summation of all the sub-carrier signals.

26. The method of claim 1, wherein the weighted summation of a plurality of the sub-carrier signals comprises a weighted summation of a plurality of the sub-carrier signals of the first signal and a plurality of the sub-carrier signals of the second signal.

27. The method of claim 1, wherein the selected single phase setting for the phase relationship between the first and second signals based on a weighted summation of a plurality of the sub-carrier signals, provides a joint optimization over a combination of sub-carriers, and is sub-optimal for SNR and SIR for at least one individual sub-carrier.

28. A multi-chain receiver comprising;
a first receiver chain connected to a first receiver antenna;
a second receiver chain connected to a second receiver antenna;
an adjustable phase adjustor for adjusting a first phase of a first signal received by the first receiver chain with respect to a second phase of a second signal received by the second receiver chain, the first signal comprising multiple sub-carrier signals, the second signal comprising multiple sub-carrier signals; and
a processor for processing the combined phase adjusted first signal and second signal, the processing including selecting a single phase setting for the phase relationship between the first and second signals based on a weighted summation of a plurality of the sub-carrier signals, providing a joint optimization of SNR and SIR over a combination of sub-carriers.

29. The receiver of claim 28, wherein the first signal and the second signal comprise a desired signal and at least one interference signal.

30. The receiver of claim 28, wherein the processing comprises estimating a channel response associated with the first antenna, and estimating a channel response associated with the second antenna.

31. The receiver of claim 30, wherein the channel responses are between a desired signal source and the first antenna, and the second antenna.

32. The receiver of claim 30, wherein the processing further comprises adjusting the phase until the channel responses are maximized.

33. The receiver of claim 28, further comprising determining a signal to noise ratio (SNR) and signal to interference ratio (SIR) of the first signal and the second signal.

34. The receiver of claim 33, wherein if the SIR is threshold less than the SNR, then the phase is adjusted to minimize a summation of interference signal channel responses over a plurality of time samples.

35. The receiver of claim 34, wherein the minimization is based on response of tones of multi-carrier signals.

36. The method of claim 33, wherein if the SIR is a threshold less than the SNR, then the phase is adjusted to maximize the SIR.

37. The receiver of claim 33, wherein if the SIR is a threshold greater than the SNR, then the phase is adjusted to maximize a summation desired signal channel responses over a plurality of time samples.

38. The receiver of claim 37, wherein the maximization is based on response of tones of multi-carrier signals.

39. The receiver of claim 37, if the summation is less than a summation of second signal channel responses, then the second signal of the second antenna is processed.

40. The receiver of claim 37, if the summation is less than a summation of second signal channel responses, then the second signal of the second antenna is processed.

41. The method of claim 33, wherein if the SIR is a threshold greater than the SNR, then the phase is adjusted to maximize the SNR.

42. A transceiver comprising:
a receiver, the receiver including;
a first receiver chain connected to a first antenna
a second receiver chain connected to a second antenna
an adjustable phase adjustor for adjusting a first phase of a first signal received by the first receiver chain with respect to a second phase of a second signal received by the second receiver chain, the first signal comprising multiple sub-carrier signals, the second signal comprising multiple sub-carrier signals; and
a processor for processing the combined phase adjusted first signal and second signal, the processing including selecting a single phase setting for the phase relationship between the first and second signals based on a weighted summation of a plurality of the sub-carrier signals, providing a joint optimization of SNR and SIR over a combination of sub-carriers;
a transmitter, the transmitter including;
a first transmitter chain connected to the first antenna;
a second transmitter chain connected to the second antenna; wherein
the adjustable phase adjustor also adjusts a first phase of a first transmit signal of the first transmitter chain with respect to a second phase of a second transmit signal of the second transmitter chain.

43. The transceiver of claim 42, wherein the signal to noise ratio is optimized at the transmitter.

44. The transceiver of claim 43, wherein the signal to noise ratio is optimized by phase combining at the transmitter.

45. The transceiver of claim 42, wherein the signal to interference ratio is optimized at the receiver.

46. The transceiver of claim 45, wherein the signal to interference ratio is optimized by phase combining at the receiver.

47. The transceiver of claim 42, wherein transmit signals are phase adjusted to optimize SNR, and receive signals are phase adjusted to optimize SIR.

48. A multi-chain transmitter comprising:
a first transmitter chain connected to a first antenna;
a second transmitter chain connected to a second antenna; wherein
an adjustable phase adjustor adjusts a first phase of a first transmit signal of the first transmitter chain with respect to a second phase of a second transmit signal of the second transmitter chain, the first signal comprising multiple sub-carrier signals, the second signal comprising multiple sub-carrier signals;
a phase adjust controller receiving feedback from a receiver of the first and second transmit signals; wherein
the feedback is generated by processing at the receiver, and includes processing the combined phase adjusted first signal and second signal, the processing including selecting a single phase setting for the phase relationship between the first and second signals based on a weighted summation of a plurality of the sub-carrier signals, providing a joint optimization of SNR and SIR over a combination of sub-carriers.

49. A method of receiving transmitted signals comprising:
a first antenna receiving a first signal, the first signal comprising multiple sub-carrier signals;
a second antenna receiving a second signal, the second signal comprising multiple sub-carrier signals;
adjusting a phase relationship between the first signal and the second signal;

combining the phase adjusted first signal and second signal;

processing the phase adjusted first signal and second signal, the processing including selecting a single phase setting for the phase relationship between the first and second signals based on a weighted summation of a plurality of the sub-carrier signals, providing an optimization of SNR over a combination of sub-carriers.

50. A method of receiving transmitted signals comprising:

a first antenna receiving a first signal, the first signal comprising multiple sub-carrier signals;

a second antenna receiving a second signal, the second signal comprising multiple sub-carrier signals;

adjusting a phase relationship between the first signal and the second signal;

combining the phase adjusted first signal and second signal;

processing the phase adjusted first signal and second signal, the processing including selecting a single phase setting for the phase relationship between the first and second signals based on a weighted summation of a plurality of the sub-carrier signals, providing an optimization of SIR over a combination of sub-carriers.

\* \* \* \* \*

UNITED STATES PATENT AND TRADEMARK OFFICE
CERTIFICATE OF CORRECTION

PATENT NO. : 7,324,794 B2  Page 1 of 1
APPLICATION NO. : 10/952620
DATED : January 29, 2008
INVENTOR(S) : Sujai Chari et al.

It is certified that error appears in the above-identified patent and that said Letters Patent is hereby corrected as shown below:

On the title page, item [75] 2nd Inventor should read --Raveev Krishnamoorthy--.

Signed and Sealed this

Third Day of March, 2009

JOHN DOLL
*Acting Director of the United States Patent and Trademark Office*